United States Patent [19]

Mao

[11] Patent Number: 5,784,142
[45] Date of Patent: Jul. 21, 1998

[54] HAIR CLIP IN COMBINATION WITH SUN GLASSES STRUCTURE

[76] Inventor: Chun-Pi Mao, No. 14, Lane 342, Kai Yuan Rd., Tainan City, Taiwan

[21] Appl. No.: 924,981

[22] Filed: Sep. 8, 1997

[51] Int. Cl.⁶ .................................. G02C 5/14; G02C 1/00
[52] U.S. Cl. ............................. 351/119; 351/111; 351/158
[58] Field of Search ...................................... 351/158, 118, 351/119, 121, 123, 116, 111, 41; 2/453

[56] References Cited

U.S. PATENT DOCUMENTS 5,594,511  1/1997  Lin ............................................. 351/116

*Primary Examiner*—Hung X. Dang
*Attorney, Agent, or Firm*—Charles E. Baxley, Esq.

[57] ABSTRACT

A hair clip/sun glasses structure includes a goggle frame having two side members. Each side member includes a retainer formed on an inner side thereof. Each side member further includes an engaging member extending rearwardly from a distal end thereof. An opening is defined between the side member and the engaging member. A clip member is releasably attached to each side member. Each clip member includes a latch formed on a first end thereof. Each latch is extended through the associated opening and retained by the associated retainer.

1 Claim, 5 Drawing Sheets

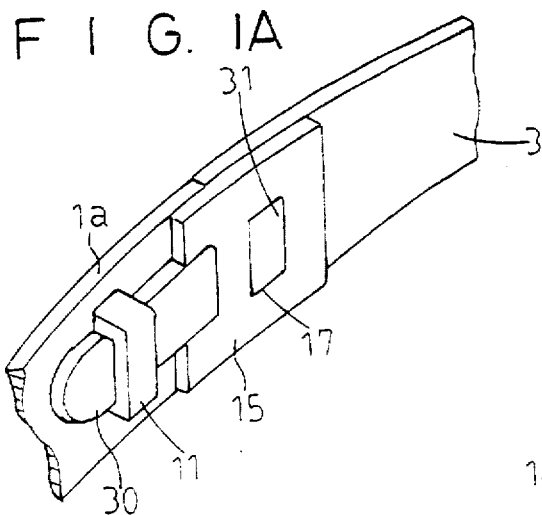
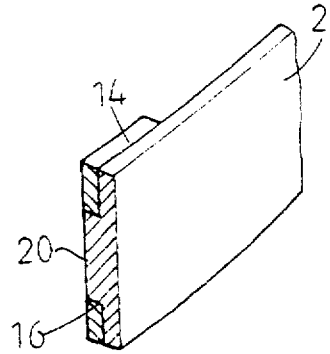
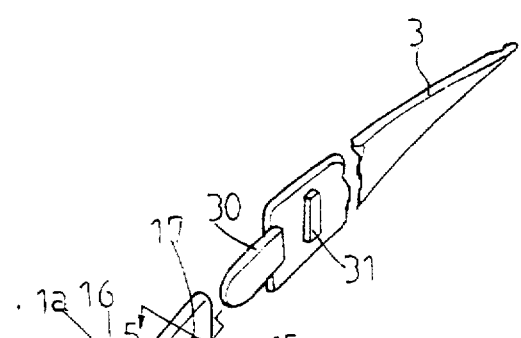
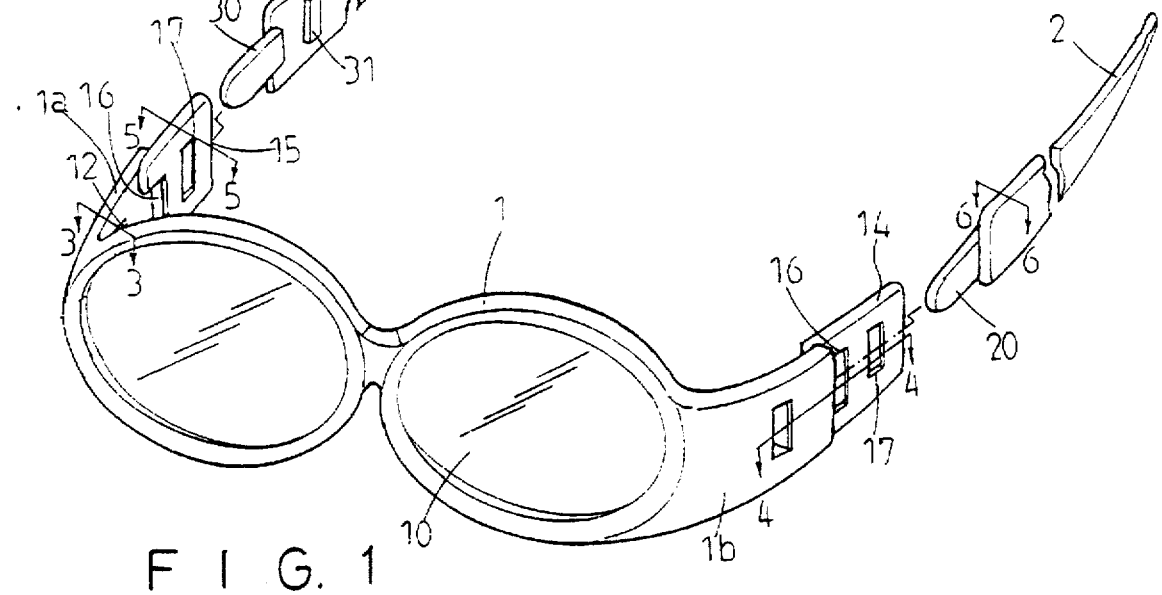

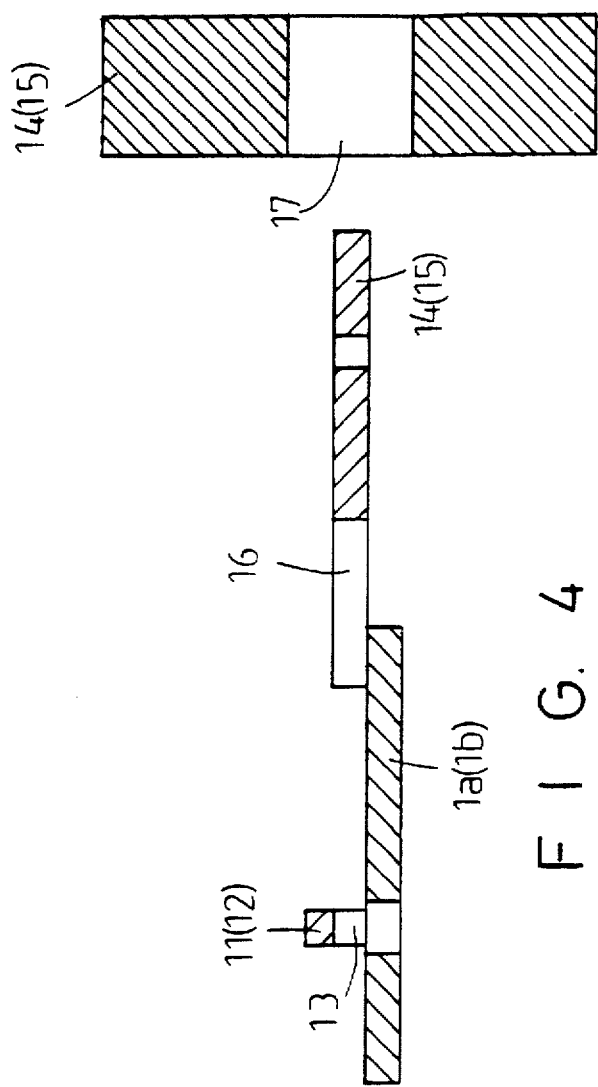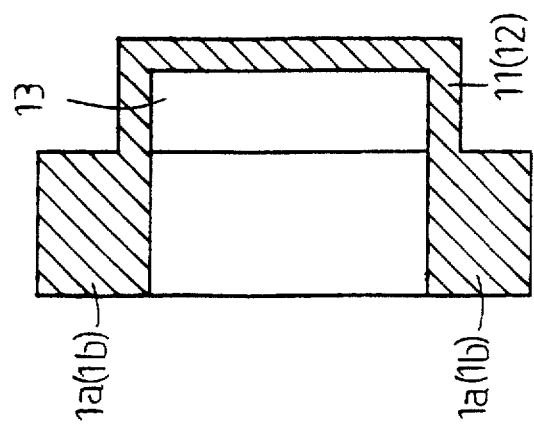

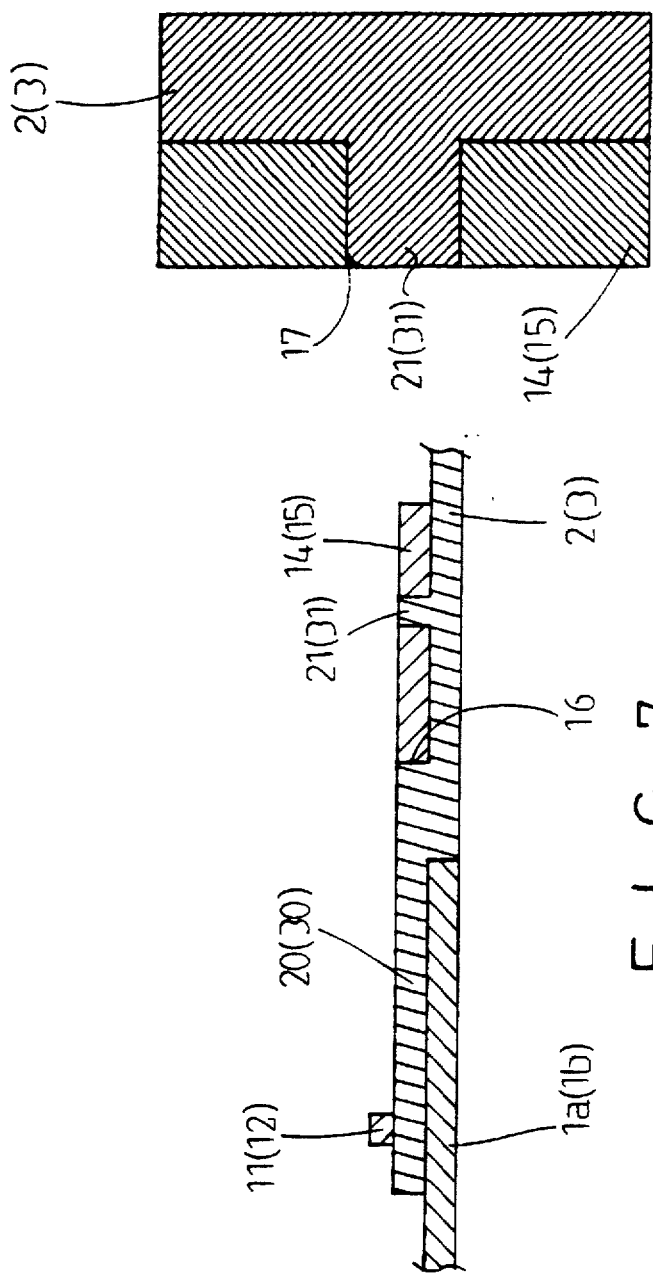
FIG. 8
FIG. 7
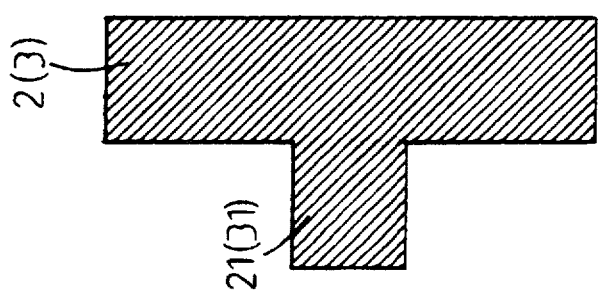
FIG. 6

HAIR CLIP IN COMBINATION WITH SUN GLASSES STRUCTURE

BACKGROUND OF THE INVENTION

1. Field of the Invention

The present invention relates to a hair clip/sun glasses structure which can be used as not only a hair clip but also a pair of sun glasses.

2. Description of the Related Art

Women often use hair clips to position their hair and to achieve an aesthetic purpose. Nevertheless, the hair clips are integral objects and thus provide monotonous decoration. In addition, various molds are required to manufacture hair clips of different shapes and patterns. The present invention is intended to provide a hair clip structure which can be detached and assembled to provide the user with different choices in the shapes and patterns of the hair clip. In addition, the hair clip structure can also be used as a sun glasses.

SUMMARY OF THE INVENTION

A hair clip/sun glasses structure in accordance with the present invention comprises a goggle frame having two side members. Each side member includes a retainer means formed on an inner side thereof. Each side member further includes an engaging member extending rearwardly from a distal end thereof. An opening is defined between the side member and the engaging member.

A clip member is releasably attached to each side member. Each clip member includes a latch formed on a first end thereof. Each latch is extended through the associated opening and retained by the associated retainer means.

In a preferred embodiment of the invention, each clip member includes a protrusion formed on a side thereof, and each engaging member includes an engaging slot defined therein for releasably receiving the protrusion of the clip member.

Other objects, advantages, and novel features of the invention will become more apparent from the following detailed description when taken in conjunction with the accompanying drawings.

BRIEF DESCRIPTION OF THE DRAWINGS

FIG. 1 is an exploded perspective view of a hair clip/sun glasses structure in accordance with the present invention;

FIG. 1A is a partial perspective view illustrating engagement between a first clip member and a first side member of a goggle frame;

FIG. 1B is a partial perspective view illustrating engagement between a second clip member and a second side member of the goggle frame;

FIG. 3 is a cross sectional view taken along line 3—3 in FIG. 1;

FIG. 4 is a cross sectional view taken along line 4—4 in FIG. 1;

FIG. 5 is a cross sectional view taken along line 5—5 in FIG. 1;

FIG. 6 is a cross sectional view taken along line 6—6 in FIG. 1;

FIG. 7 is a cross sectional view taken along line 7—7 in FIG. 2;

FIG. 8 is a cross sectional view taken along line 8—8 in FIG. 2; and

DESCRIPTION OF THE PREFERRED EMBODIMENT

Figure 2:
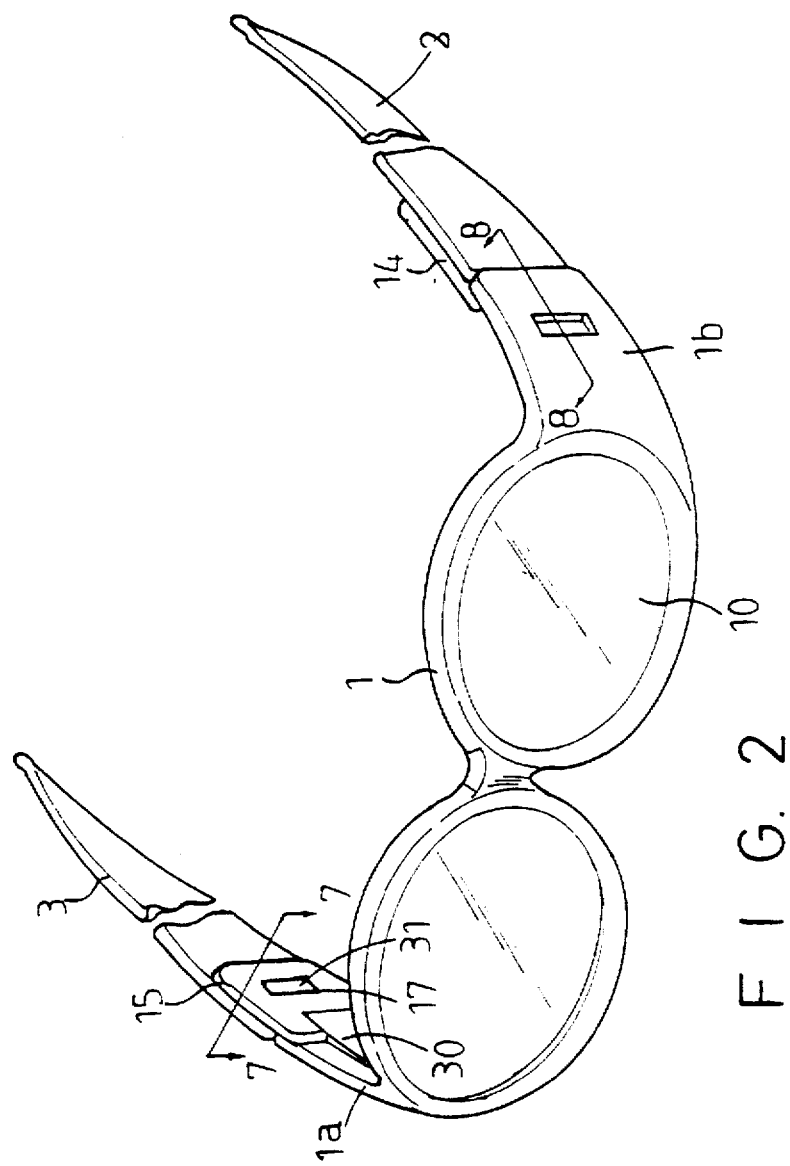
FIG. 2 is a perspective view of the hair clip/sun glasses structure in accordance with the present invention.

Referring to the drawings and initially to FIGS. 1 and 2, a hair clip/sun glasses structure in accordance with the present invention generally includes a goggle frame 1 comprising a pair of lenses 10 mounted therein and two side members 1a and 1b. Each side member 1a, 1b includes a U-shaped retainer 11 (FIGS. 1A and 3) integrally formed on an inner side thereof. Each side member 1a, 1b further includes an engaging member 15, 14 (FIGS. 1 and 4) extending rearwardly from a distal end thereof, yet an opening 16 being defined between the side member 1a, 1b and the engaging member. Each engaging member 15, 14 may include an engaging slot 17 (FIG. 5) defined therein.

A first clip member 3 is releasably attached to the side member 1a while a second clip member 2 is releasably attached to the side member 1b. As shown in FIGS. 1 and 1A, the first clip member 3 includes a first latch 30 formed on a first end thereof and a protrusion 31 (FIG. 6) formed on a side thereof. In use, referring to FIGS. 1 and 2, the latch 30 of the first clip member 3 is passed through the opening 16 and then extended through the retainer 11. The protrusion 31 on the first clip member 3 is releasably received in the engaging slot 17 (FIGS. 7 and 8). The second clip member 2 includes a second latch 20 (FIGS. 1 and 1B) formed on a first end thereof and a protrusion 21 (FIG. 7) formed on a side thereof. In use, the second latch 20 of the second clip member 2 is passed through the opening 16 and then extended through the retainer 11. The protrusion 21 on the second clip member 2 is releasably received in the engaging slot 17 (FIGS. 7 and 8). Curvatures of the first clip member 3 and the second clip member 2 allow the assembled hair clip/sun glasses to be fittingly put on the head of the user. In addition, the first and second clip members 3 and 2 may have any desired shapes and patterns according to the need of the user, i.e., the user may choose the shape and pattern that she likes.

Figure 9:
FIGS. 9 and 10 are schematic views illustrating use of the hair clip/sun glasses structure of the present invention.
Figure 10:
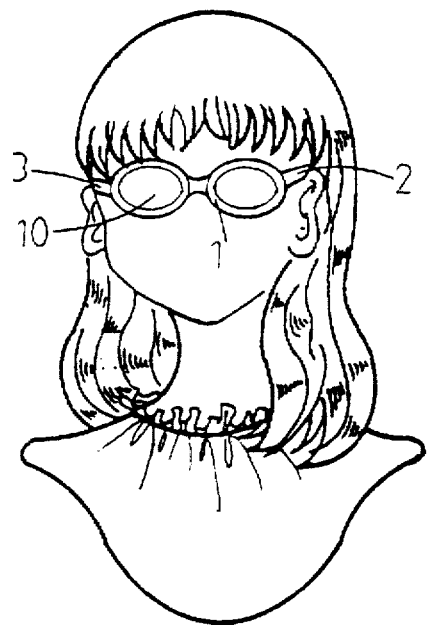

According to the above description, it is appreciated that the hair clip/sun glasses of the present invention may serve as a sun glass (FIG. 10) as well as a hair clip (FIG. 9), and the user may choose her favorite shapes and patterns of the hair clip.

Although the invention has been explained in relation to its preferred embodiment, it is to be understood that many other possible modifications and variations can be made without departing from the spirit and scope of the invention as hereinafter claimed.

What is claimed is:

1. A hair clip in combination with sun glasses structure, comprising:

a goggle frame comprising two side members, each said side member including a retainer means formed on an inner side thereof, each said side member further including an engaging member extending rearwardly from a distal end thereof, an opening being defined between said side member and the engaging member, and a clip member releasably attached to each said side member, each said clip member including a latch formed on a first end thereof, each said latch being extended through said opening and said retainer means, each said clip member further including a protrusion formed on a side of thereof, and each said engaging member includes an engaging slot defined therein for releasably receiving the protrusion of said clip member.

* * * * *